United States Patent [19]

Jöns

[11] 4,416,562

[45] Nov. 22, 1983

[54] MULTI-PARTITE ASSEMBLY

[75] Inventor: Claus Jöns, Sachsenheim, Fed. Rep. of Germany

[73] Assignee: Robert Bosch GmbH, Stuttgart, Fed. Rep. of Germany

[21] Appl. No.: 212,672

[22] Filed: Dec. 3, 1980

[30] Foreign Application Priority Data

Dec. 22, 1979 [DE] Fed. Rep. of Germany ... 7936314[U]

[51] Int. Cl.³ .............................................. F16B 17/00
[52] U.S. Cl. ...................................... 403/13; 403/292; 403/280
[58] Field of Search ............... 403/280, 292, 298, 281, 403/282, 276, 279, 13, 14, 408; 29/525 R

[56] References Cited

U.S. PATENT DOCUMENTS 569,235 10/1896 Rockwell ........................ 403/298 X
2,380,287 7/1945 Baumbach ..................... 29/525 UX

FOREIGN PATENT DOCUMENTS 688480 6/1964 Canada ................................. 403/292

Primary Examiner—Andrew V. Kundrat
Attorney, Agent, or Firm—Michael J. Striker

[57] ABSTRACT

A multi-partite assembly, for example an assembly including a housing and a cover, has a centering sleeve received in bores formed, respectively, in the housing and in the cover. The diameter of the bore made in the housing is relatively smaller than the diameter of the bore formed in the cover and the diameter of the centering sleeve. The sleeve is slidably received in the bore of the cover and press-fitted in the bore made in the housing, thereby the reliable alignment of the housing and the cover is obtained.

6 Claims, 1 Drawing Figure

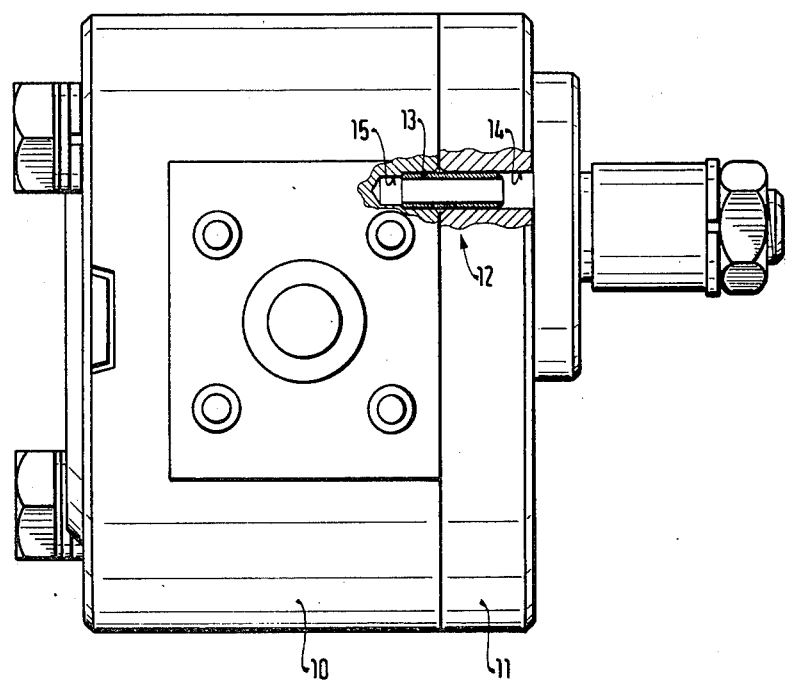

MULTI-PARTITE ASSEMBLY

BACKGROUND OF THE INVENTION

The present invention pertains to multi-partite assemblies, and more particularly to centering arrangements which are utilized for aligning of two parts to be assembled.

In the known multi-partite assemblies the centering arrangements include a pin inserted into a sleeve of synthetic material mounted on the parts to be jointed and which are connected to each other by means of ultrasonic waves and are so deformed that a circular space between a bore and the pin is tightly filled with the synthetic material. This arrangement is rather expensive because it requires the use of some additional elements such as a sleeve of synthetic material and the utilization of a special process.

SUMMARY OF THE INVENTION

It is an object of the invention to provide an improved multi-partite assembly which is easy to assemble.

Another object of the invention is to provide a multi-partite assembly having a centering arrangement which is rather inexpensive.

Still another object of the invention is to provide an assembly where connecting of the parts to be jointed by screws after the parts have been centered is facilitated.

These and other objects of the invention are attained by multi-partite assembly, comprising at least two parts each having a bore one of which has a larger diameter and the other of which has a smaller diameter, and a substantially cylindrical centering element received in said bores and having an outer diameter equal to the diameter of said one bore, said element being slidably received in said one bore and with a friction-fit in the other of said bores so as to align the same.

The centering element may be a hollow sleeve.

The centering element may be a pin.

Said other bore may be a pocket bore.

Said pocket bore has an end face, said centering element extending into said pocket bore but short of said end face.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The sole FIGURE illustrates an assembly according to the invention.

DETAILED DESCRIPTION OF THE PREFERRED EMBODIMENT

The sole FIGURE of the drawing illustrates an assembly where a housing 10 is sealingly closed with a cover 11. In such kinds of arrangements the cover 11 must be precisely aligned with the housing 10 so that the adjustment of the correlated parts should not be required.. For this purpose a safety arrangement generally designated as 12 is provided, which includes a clamping sleeve 13 formed in this embodiment as a safety pin. A through bore 14 is formed in the cover 11 whereas a pocket bore 15 is made in the housing 10. The diameter of the bore 15 is somewhat smaller than that of the bore 14. It is to be understood that there is a possibility that the bores 14 and 15 are not precisely aligned with one another which happens when the bores have rather coarse tolerances. This happens when both bores are separately drilled which takes place in the majority of cases when two separate parts to be jointed are fabricated. This is substantially less expensive than in the case when the bores in two correlated parts, such as the housing 10 and the cover 11, are drilled simultaneously in one operating step in order to precisely center two parts to one another.

After the bores 14 and 15 are separately drilled, the cover 11 is adjusted on the housing 10 and centered relative thereto. Then a clamping sleeve 13 is inserted into the bore 14. The diameter of the sleeve or pin 13 approximately corresponds to the diameter of the bore 14 and is somewhat larger than that of the bore 15. The sleeve 13 is thereafter pressed into the pocket bore 15, preferably not to the end face of the pocket bore. Under this pressure action the material of the housing in the region of the bore 15 will be displaced and accumulated in the lower part of the pocket bore 15. Both parts will be then absolutely aligned in their position relatively one to another and reliably fixed.

It is evident that it is possible to install a second safety arrangement on the parts to be jointed which is similar to that above-described. The safety arrangements according to invention are particularly suitable where a material of the housing or a part having a bore with a relatively smaller diameter is softer than a material of the cover.

It is to be understood that it is also possible to use standard commonly used safety pins instead of clamping sleeves described in the preferred embodiment of the invention. Advantageously, the clamping sleeves or safety pins may be made of a hardened material.

It will be understood that each of the elements described above, or two or more together, may also find a useful application in other types of multi-partite assembly differing from the types described above.

While the invention has been illustrated and described as embodied in a multi-partite assembly, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A multi-partite assembly, comprising at least two parts each having a bore, one which has a larger diameter and the other of which has a smaller diameter; and a substantially cylindrical centering element received in said bores and having an outer diameter equal to the diameter of said one bore, said element being slidably received in said one bore and with a friction-fit in the other of said bores so as to align the same.

2. The assembly of claim 1, wherein said element is a hollow sleeve.

3. The assembly of claim 1, wherein said element is a pin.

4. The assembly of claim 1, wherein said other bore is a pocket bore.

5. The assembly of claim 4, wherein said pocket bore has an end face, said centering element extending into said pocket bore but short of said end face.

6. The assembly of claim 1, wherein said centering element is formed of hardened metal.

* * * * *